United States Patent
Saito et al.

(10) Patent No.: US 9,473,692 B2
(45) Date of Patent: Oct. 18, 2016

(54) IMAGE PROCESSING APPARATUS, IMAGING APPARATUS, AND DETERMINATION METHOD FOR CONTROLLING LIGHT EMISSION

(71) Applicant: Olympus Corporation, Hachioji-shi, Tokyo (JP)

(72) Inventors: Keisuke Saito, Fussa (JP); Takashi Gando, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/665,757

(22) Filed: Mar. 23, 2015

(65) Prior Publication Data

US 2015/0288871 A1     Oct. 8, 2015

(30) Foreign Application Priority Data

Apr. 3, 2014  (JP) ................... 2014-077185

(51) Int. Cl.
  *H04N 5/232*    (2006.01)
  *H04N 5/235*    (2006.01)

(52) U.S. Cl.
  CPC ........ *H04N 5/23212* (2013.01); *H04N 5/2354* (2013.01); *H04N 5/23222* (2013.01); *H04N 5/23245* (2013.01); *H04N 5/23293* (2013.01)

(58) Field of Classification Search
  CPC .............. H04N 5/23212; H04N 5/23222; H04N 5/23245; H04N 5/23293
  See application file for complete search history.

(56) References Cited

U.S. PATENT DOCUMENTS

| 6,037,976 A | * | 3/2000 | Wixson | G06K 9/00785 |
| | | | | 348/122 |
| 6,353,392 B1 | * | 3/2002 | Schofield | B60H 1/00785 |
| | | | | 318/444 |
| 6,868,190 B1 | * | 3/2005 | Morton | G06T 5/00 |
| | | | | 348/208.13 |
| 2008/0174678 A1 | * | 7/2008 | Solomon | G02B 27/0025 |
| | | | | 348/231.99 |
| 2009/0010494 A1 | * | 1/2009 | Bechtel | B60Q 1/1423 |
| | | | | 382/104 |
| 2011/0261261 A1 | * | 10/2011 | Mori | G06T 5/009 |
| | | | | 348/607 |

(Continued)

FOREIGN PATENT DOCUMENTS

| JP | 2011-003048 | 1/2011 |
| JP | 2012-054904 | 3/2012 |

(Continued)

*Primary Examiner* — Amy Hsu
(74) *Attorney, Agent, or Firm* — John C. Pokotylo; Straub & Pokotylo

(57) ABSTRACT

An image processing apparatus includes: an evaluation value calculation unit configured to calculate a contrast evaluation value of each of first image data and second image data in which an object is imaged in a state in which auxiliary light is emitted to the object included in a first image corresponding to the first image data; a determination unit configured to determine that fog or haze is occurring at a time the contrast evaluation value of the first image data, which has been calculated by the evaluation value calculation unit, is equal to or greater than the contrast evaluation value of the second image data; and an image processing unit configured to perform image processing to the first image data or the second image data based on a determination result of the determination unit.

10 Claims, 13 Drawing Sheets

(56) References Cited

U.S. PATENT DOCUMENTS

| | | | | |
|---|---|---|---|---|
| 2012/0116632 | A1* | 5/2012 | Bechtel | B60Q 1/1423 701/36 |
| 2012/0224787 | A1* | 9/2012 | Imai | H04N 5/2352 382/274 |
| 2014/0015960 | A1* | 1/2014 | Niedermeier | G01N 21/909 348/128 |
| 2014/0211064 | A1* | 7/2014 | Sasaki | G03B 5/06 348/333.01 |
| 2014/0232872 | A1* | 8/2014 | Kussel | B60R 1/00 348/148 |
| 2014/0293079 | A1* | 10/2014 | Milanfar | H04N 5/2171 348/222.1 |
| 2014/0314332 | A1* | 10/2014 | Mudge | G01J 4/04 382/255 |

FOREIGN PATENT DOCUMENTS

| | | |
|---|---|---|
| JP | 2012-165051 | 8/2012 |
| JP | 2012-167983 | 9/2012 |

* cited by examiner

IMAGE PROCESSING APPARATUS, IMAGING APPARATUS, AND DETERMINATION METHOD FOR CONTROLLING LIGHT EMISSION

CROSS REFERENCE TO RELATED APPLICATIONS

This application is based upon and claims the benefit of priority from Japanese Patent Application No. 2014-077185, filed on Apr. 3, 2014, the entire contents of which are incorporated herein by reference.

BACKGROUND OF THE INVENTION

1. Field of the Invention

The present invention relates to an image processing apparatus configured to perform image processing on image data input from the outside, an imaging apparatus, and a determination method performed by the image processing apparatus.

2. Description of Related Art

In an imaging apparatus such as a digital camera, a technique to correct a hazy image by image processing has been recently known (for example, Japanese Patent Application Laid-open No. 2011-3048). In the technique, a contrast component for removal is generated based on information indicating each of minimum and maximum brightness in each pixel of an image to be processed, and haze is removed by correcting a gradation of the image to be processed by adding the contrast component to a luminance component of the image to be processed.

SUMMARY OF THE INVENTION

An image processing apparatus according to one aspect of the present invention includes: an evaluation value calculation unit configured to calculate a contrast evaluation value of each of first image data and second image data in which an object is imaged in a state in which auxiliary light is emitted to the object included in a first image corresponding to the first image data; a determination unit configured to determine that fog or haze is occurring at a time the contrast evaluation value of the first image data, which has been calculated by the evaluation value calculation unit, is equal to or greater than the contrast evaluation value of the second image data; and an image processing unit configured to perform image processing to the first image data or the second image data based on a determination result of the determination unit.

An imaging apparatus according to another aspect of the present invention includes: an imaging unit configured to generate image data of an object by imaging the object; an auxiliary light emitting unit configured to emit auxiliary light to the object; an evaluation value calculation unit configured to calculate a contrast evaluation value of each of first image data generated by the imaging unit and second image data generated by the imaging unit in a state in which the auxiliary light emitting unit emits auxiliary light to the object; a determination unit configured to determine that fog or haze is occurring at a time the contrast evaluation value of the first image data, which has been calculated by the evaluation value calculation unit, is equal to or greater than the contrast evaluation value of the second image data; and a light emission controller configured to output an inhibition signal for inhibiting auxiliary light emission to the auxiliary light emitting unit at a time the determination unit determines that the fog or haze is occurring.

A determination method performed by an image processing apparatus according to still another aspect of the present invention includes: calculating a contrast evaluation value of each of first image data and second image data in which an object is imaged in a state in which auxiliary light is emitted to the object included in a first image corresponding to the first image data; determining that fog or haze is occurring at a time a contrast evaluation value of the first image data is equal to or greater than a contrast evaluation value of the second image data; and performing image processing with respect to the first image data or the second image data based on a determination result of the determination unit.

The above and other features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments of the present invention will be described below with reference to drawings (hereinafter called "embodiments"). The present invention is not limited to the embodiments to be described below. An example of an imaging apparatus including an image processing apparatus according to the present invention will be described below. The same components illustrated in drawings are denoted with the same signs.

First Embodiment

Figure 1:
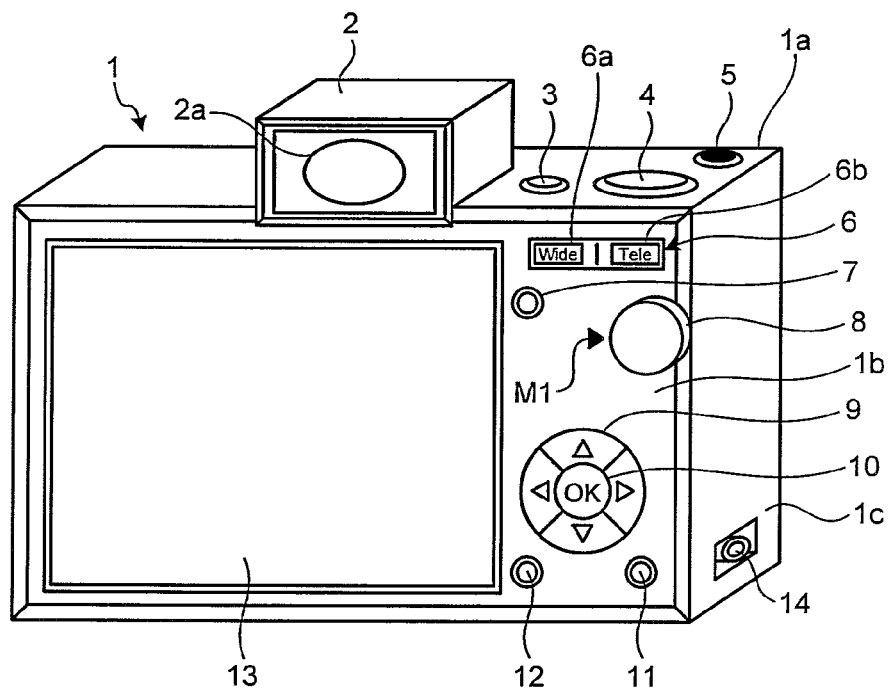
FIG. 1 is an appearance perspective view illustrating a back surface side of an imaging apparatus according to a first embodiment of the present invention.
Figure 2:
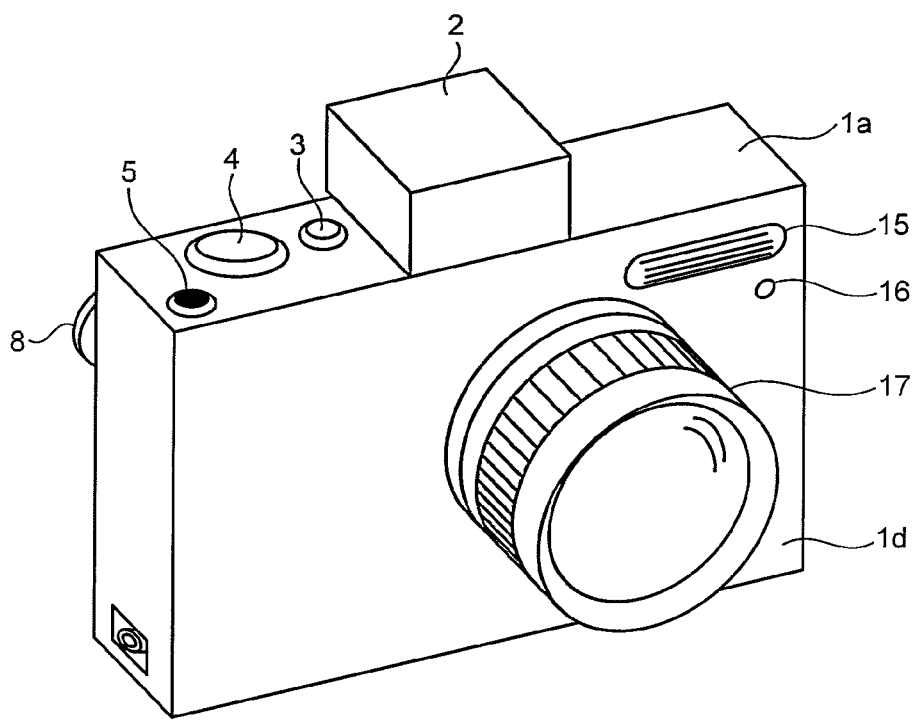
FIG. 2 is an appearance perspective view illustrating a front surface side of the imaging apparatus according to the first embodiment of the present invention.

FIG. 1 is an appearance perspective view illustrating a back surface side of an imaging apparatus according to a first embodiment of the present invention. FIG. 2 is an appearance perspective view illustrating a front surface side of the imaging apparatus according to the first embodiment of the present invention.

An imaging apparatus 1 illustrated in FIGS. 1 and 2 includes an electronic viewfinder 2 (hereinafter called "EVF 2") approximately at a center of an upper portion 1a. Also, the imaging apparatus 1 includes a power button 3, a release button 4, and a moving image recording button 5 at the upper portion 1a. The imaging apparatus 1 further includes a zoom button 6, a display switching button 7, a mode dial 8, a cross button 9, an OK button 10, a delete button 11, and a menu button 12 on a right side of a back surface 1b. The imaging apparatus 1 further includes a back display unit 13 on a left side of the back surface 1b. The imaging apparatus 1 also includes a DC input terminal 14 on a side surface 1c. The imaging apparatus 1 includes an auxiliary light emitting unit 15, a light control window 16, and a lens barrel 17 on a front surface side 1d.

The EVF 2 includes a small EVF display panel therein. From the EVF 2, a photographer can monitor a live view image and a playback image displayed on the EVE display panel via a finder eyepiece 2a.

The imaging apparatus 1 is powered on when a photographer depresses the power button 3, and the imaging apparatus 1 is powered off when the photographer depresses the power button 3 again. Other operating member such as a power switch may be arranged instead of the power button 3.

The imaging apparatus 1 performs an image capturing preparation operation when a photographer half-depresses the release button 4, and the imaging apparatus 1 performs an image capturing operation when the photographer fully depresses the release button 4. In an image capturing preparation state, the imaging apparatus 1 measures a field luminance by photometry, calculates an exposure control value such as an aperture value and a shutter speed from field luminance distribution obtained by the photometry, and performs automatic focus adjustment (Auto-Focus). When performing the image capturing operation, the imaging apparatus 1 controls exposure in accordance with the exposure control value calculated in the above-described image capturing preparation state, and records image data of a still image imaged by an imaging unit to be described later in a recording medium 33 to be described later.

The moving image recording button 5 is an operating member for receiving input of an instruction signal for instructing to start and stop recording a moving image. In the case where the moving image recording button 5 is depressed by a photographer in a state in which a moving image shooting mode is selected in the imaging apparatus 1 by the mode dial 8 to be described later, moving image capturing starts in the imaging apparatus 1 which sequentially records, in a recording medium, image data of the moving image imaged by the imaging unit. In the case where the moving image recording button 5 is depressed by a photographer when the imaging apparatus 1 is capturing a moving image, the imaging apparatus 1 records the captured moving image. The release button 4 may be used as the moving image recording button 5. In such a case, when a moving image recording mode is set by such as the mode dial 8 and a menu screen, moving image capturing may be started and stopped by operating the release button 4.

The zoom button 6 is an operating member for adjusting a focal distance of an image capturing lens in the lens barrel 17 of the imaging apparatus 1. The zoom button 6 includes a wide (Wide) button 6a and a tele (Tele) button 6b.

When the wide button 6a is depressed by a photographer, a focal distance of an image capturing lens is moved to a wide angle (single focus) side. In the case where the wide button 6a is depressed by a photographer and further continuously depressed after the focal distance of the image capturing lens is stopped at the shortest focal distance (wide end), a mode of the imaging apparatus 1 is switched to a macro mode.

The tele button 6b is depressed by a photographer, the focal distance of the image capturing lens is moved to a telephoto (long focus) side. In the case where the tele button 6b is further continuously depressed after the focal distance of the image capturing lens is stopped at the longest focal distance (tele point), an image is further magnified by switching to an electronic zoom. The electronic zoom is different from optical zoom, and zooming is performed by clipping and magnifying part of image data. According to the embodiment, a focal distance of an image capturing lens is adjusted by the zoom button 6, but not limited thereto. For example, the focal distance of the image capturing lens may be adjusted by a rotary member (such as a zoom ring and a zoom switch), and the focal distance of the image capturing lens may be adjusted by providing a rotary member and a zoom switch on an outer peripheral side of the lens barrel 17.

The display switching button 7 is an operating member to switch the EVF 2 and the back display unit 13. Every time a photographer depresses the display switching button 7, the EVF 2 and the back display unit 13 are alternately switched, and a live view image, a playback image, and a menu screen are displayed.

The mode dial 8 is a rotatable dial, and a mode coincident with an index Ml (a triangle mark in a drawing) is performed by the imaging apparatus 1. Examples of the mode include an image shooting mode, a playback mode, an exposure control mode such as a diaphragm priority mode and a sports mode, an art filter (registered trademark), and moving image shooting mode.

The cross button 9 is a moving member to vertically and horizontally move a cursor on such as a menu screen of the imaging apparatus 1, which is displayed on the EVF 2 or the back display unit 13. The cross button 9 includes four buttons for appointing each of up, down, left, and right. The OK button 10 (also called a confirmation button) is arranged approximately at a center of the four buttons.

The OK button 10 is an operating member to determine an item selected by the cross button 9 on a menu screen of the imaging apparatus 1, which is displayed on the EVF 2 or the back display unit 13.

The delete button 11 is an operating member for deleting selected image data from the recording medium 33. The image data recorded in the recording medium 33 is deleted by depressing the delete button 11 after an image to be displayed by the EVF2 or the back display unit 13 has been appointed by the cross button 9 and the OK button 10.

The menu button 12 is an operating member to cause the EVF 2 or the back display unit 13 to display a menu screen of the imaging apparatus 1 when the menu button 12 is depressed by a photographer. The photographer can perform various settings such as an auxiliary light emission mode (flush light emission mode) by using a menu screen displayed by the EVF 2 or the back display unit 13.

The back display unit 13 includes a display panel such as a liquid crystal display panel or an organic electro luminescence (EL) display panel. The back display unit 13 displays various images such as a live view image, a playback image, and a menu image screen. Also, a touch panel to be described later is superimposed on the back display unit 13. In the case where a photographer touches the touch panel while watching an image displayed on the back display unit 13, the touch panel outputs information on the touch position to ASIC to be described later.

The DC input terminal 14 is a terminal to supply a power source to the imaging apparatus 1 by an external power source. For example, the DC input terminal 14 converts an AC power source into a DC power source, feeds a DC voltage, and charges a power supply battery 31. Also, the DC input terminal 14 is used when an image is captured by emitting auxiliary light in a room.

The auxiliary light emitting unit 15 emits auxiliary light to an object. The auxiliary light emitting unit 15 emits auxiliary light to the object by automatic light emission or by forced light emission set by a photographer when the object is dark. A light emission amount of the auxiliary light emitting unit 15 is automatically controlled while emitting auxiliary light based on a detection result by a light control sensor to be described later.

The light control window 16 is a window for guiding reflected light to the light control sensor for measuring such as reflected light from an object by photometry while the auxiliary light emitting unit 15 emits light.

The lens barrel 17 includes an image capturing lens to be described later. The lens barrel 17 may be detachable from the imaging apparatus 1 or may be fixed to the imaging apparatus 1.

Figure 3:
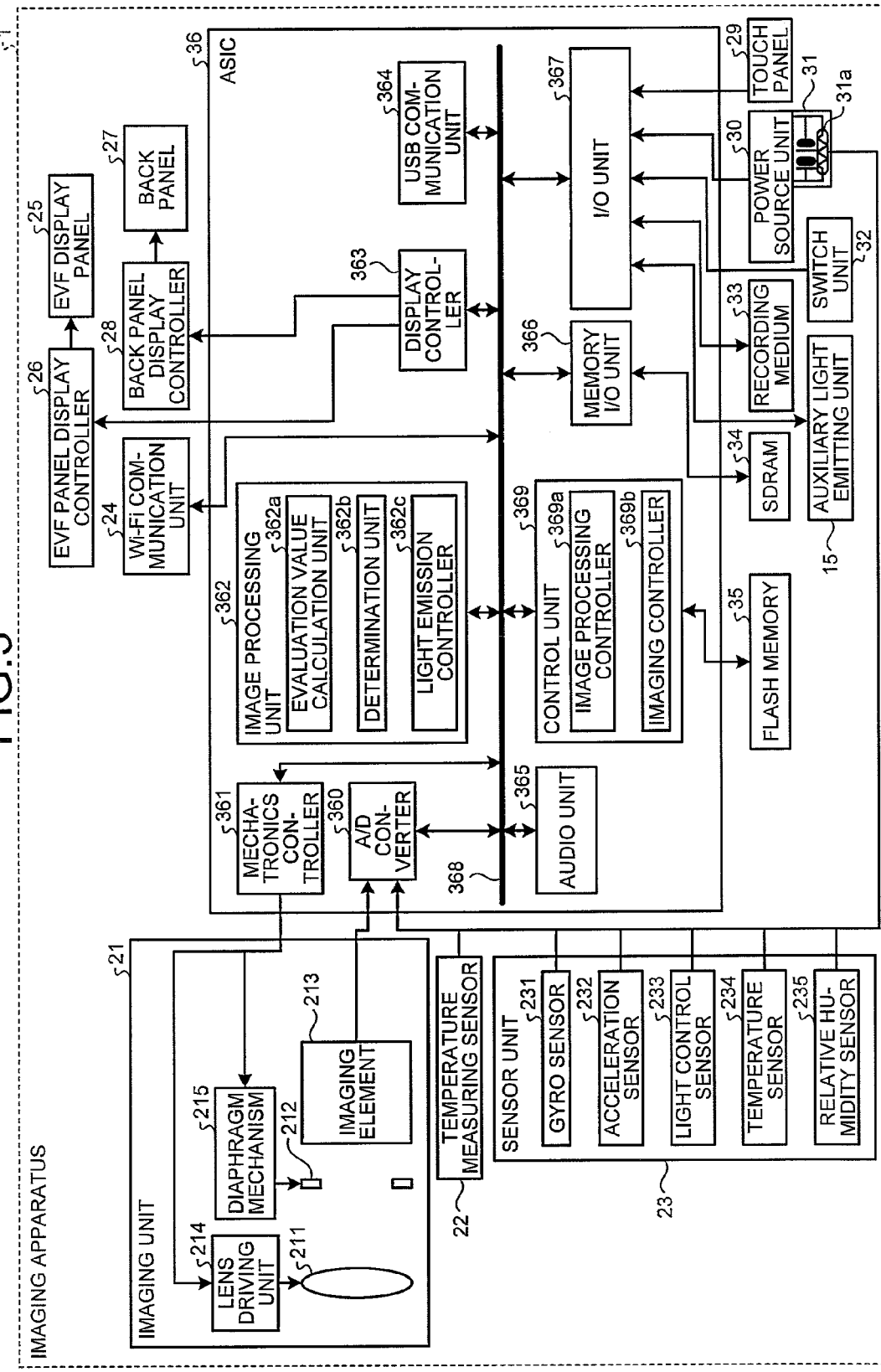
FIG. 3 is a block diagram illustrating a function configuration of the imaging apparatus according to the first embodiment of the present invention.

Next, a function configuration of the imaging apparatus 1 will be described by using FIG. 3. FIG. 3 is a block diagram illustrating a function configuration of the imaging apparatus 1.

As illustrated in FIG. 3, the imaging apparatus 1 includes an imaging unit 21, a temperature measuring sensor 22, a sensor unit 23, a wireless fidelity (Wi-Fi) (registered trademark) communication unit 24, an EVF display panel 25, an EVF panel display controller 26, a back panel 27, a back panel display controller 28, a touch panel 29, a power source unit 30, a power supply battery 31, a switch unit 32, the recording medium 33, the auxiliary light emitting unit 15, a synchronous dynamic random access memory (SDRAM) 34, a flash memory 35, and an ASIC 36.

The imaging unit 21 images an object image, generates image data of the object image, and outputs the image data to the ASIC 36. The imaging unit 21 includes an image capturing lens 211, a diaphragm 212, an imaging element 213, a lens driving unit 214, and a diaphragm mechanism 215.

The image capturing lens 211 is configured by using a zoom lens which can change a focal distance and a focus lens which can change a focal position. The image capturing lens 211 is included in the above-described lens barrel 17. The image capturing lens 211 forms an object image on a light receiving surface of the imaging element 213.

The diaphragm 212 is arranged on an optical axis of the image capturing lens 211 and adjusts an amount of light incident to the imaging element 213.

The imaging element 213 is arranged at a position, on which an object image is formed by the image capturing lens 211, and captures an optical image (object image) formed by the image capturing lens 211. The imaging element 213 is configured by using a charge coupled device (CCD) or a complementary metal oxide semiconductor (CMOS). In the imaging element 213, photodiodes forming each pixel are two-dimensionally arranged in a matrix form, and each photodiode generates a photoelectric conversion current depending on a received light amount. The photoelectric conversion current is output to the ASIC 36 after an electrical charge thereof is accumulated by a capacitor connected to each photodiode.

Also, in the imaging element 213, an optical black (OB) area, in which light is optically shielded, is included in a part of an imaging area, and a dark current IOB is detected by outputting a signal from the OB area to the ASIC 36. The imaging element 213 outputs image data to the ASIC 36 at a predetermined flame rate under control of the ASIC 36. In this light, the imaging element 213 includes an electronic shutter.

The lens driving unit 214 draws focus to an object by moving a focus lens of the image capturing lens 211 in an optical axial direction under control of the ASIC 36. Also, the lens driving unit 214 zooms (magnifies) by moving a zoom lens of the image capturing lens 211 in an optical axial direction under control of the ASIC 36. The lens driving unit 214 is configured by using a DC motor and a stepping motor.

The diaphragm mechanism 215 adjusts a light amount of an object luminous flux passing through the image capturing lens 211 by driving the diaphragm 212 under control of the ASIC 36. The diaphragm mechanism 215 is configured by using such as a stepping motor.

The temperature measuring sensor 22 measures an environmental temperature of the imaging element 213 and outputs the measurement result to the ASIC 36. The temperature measuring sensor 22 is arranged in a vicinity of the imaging element 213. For example, the temperature measuring sensor 22 is adjacently arranged on a substrate on which the imaging element 213 is arranged.

The sensor unit 23 detects vibration applied to the imaging apparatus 1, measures reflected light of auxiliary light, and detects a temperature under circumstances of the imaging apparatus 1, and detects relative humidity. The sensor unit 23 includes at least a gyro sensor 231, an acceleration sensor 232, a light control sensor 233, a temperature sensor 234, and a relative humidity sensor 235.

The gyro sensor 231 and the acceleration sensor 232 detect vibration applied to the imaging apparatus 1 by such as hand shake and output a detection signal indicating the detection result to the ASIC 36.

The light control sensor 233 measures such as reflected light by photometry via the light control window 16 when the auxiliary light emitting unit 15 emits light, and outputs a photometric signal indicating the measurement result to the ASIC 36.

The temperature sensor 234 detects a temperature under circumstances of the imaging apparatus 1 and outputs a temperature signal indicating the detection result to the ASIC 36.

The relative humidity sensor 235 detects relative humidity under circumstances of the imaging apparatus 1 and outputs a humidity signal indicating the detection result to the ASIC 36.

A Wi-Fi communication unit 24 performs wireless communication in the Wi-Fi standard between the imaging apparatus 1 and an external device.

The EVF display panel 25 displays an image corresponding to image data input from the ASIC 36 under control of the EVF panel display controller 26. The EVF display panel 25 is configured by using a liquid crystal display panel or an organic EL display panel.

The EVF panel display controller 26 controls display of the EVF display panel 25 by inputting display image data from the ASIC 36.

The back panel 27 displays image corresponding to image data input from the ASIC 36 under control of the back panel display controller 28. The back panel 27 is configured by using a liquid crystal display panel or an organic EL display panel.

The back panel display controller 28 controls display of the back panel 27 by inputting display image data from the ASIC 36.

The touch panel 29 is superimposed on a display area of the back panel 27, detects a touch position (contact position) from the outside, and outputs a detection signal regarding the touch position to the ASIC 36.

The power source unit 30 connects to the power supply battery 31 or a DC input terminal 14, converts a power supply voltage supplied from the power supply battery 31 to a predetermined constant voltage, and supplies the constant voltage to a configuration unit of the imaging apparatus 1, for example, the imaging element 213, the sensor unit 23, and the ASIC 36. The power supply battery 31 is detachably mounted to the imaging apparatus 1. A battery temperature detection sensor 31a for detecting a temperature of the power supply battery 31 is provided in a vicinity of the power supply battery 31. The battery temperature detection sensor 31a detects a temperature of the power supply battery 31 and outputs the detection result to the ASIC 36.

The switch unit 32 includes each type of operating members such as the power button 3, the release button 4, the moving image recording button 5, the zoom button 6, the display switching button 7, the mode dial 8, the cross button 9, the OK button 10, the delete button 11, and the menu button 12, which have been described above. The switch unit 32 detects operation status of these operating members and outputs the detection result to the ASIC 36.

The recording medium 33 is detachable to the imaging apparatus 1 via an I/F, which is not illustrated, and configured by using electrically rewritable non-volatile memory. In the case where the imaging apparatus 1 performs an image capturing operation, the recording medium 33 records image data of a still image or image data of a moving image. Also, in the case where the imaging apparatus 1 performs a playback operation, the recording medium 33 outputs the recorded image data to the ASIC 36.

The auxiliary light emitting unit 15 emits auxiliary light to an object as described above. The auxiliary light emitting unit 15 is configured by using such as a xenon lamp and a light emitting diode (LED). Also, an AF auxiliary light emitting unit, which emits AF auxiliary light to an object, may be provided to the auxiliary light emitting unit 15 in the case where the imaging apparatus 1 automatically adjusts focus. In this case, the AF auxiliary light emitting unit emits AF auxiliary light to an object when a first release signal is input from the release button 4. A light amount of the AF auxiliary light is smaller than a light amount of auxiliary light.

The SDRAM 34 is connected to the ASIC 36 and temporarily stores image data generated by the imaging unit 21 via the ASIC 36 and each type of data being performed by the imaging apparatus 1, such as information for inhibiting auxiliary light emission. According to the first embodiment, the SDRAM 34 functions as a temporary storage unit.

The flash memory 35 is connected to the ASIC 36 and records a program for an operation performed by the ASIC 36 and each type adjustment value. The flash memory 35 is configured by using electrically rewritable non-volatile memory.

The ASIC 36 generally controls an operation of the imaging apparatus 1 by transferring an instruction and data to each unit included in the imaging apparatus 1. The ASIC 36 performs each processing including image processing with respect to image data input from the imaging unit 21, driving control of the imaging unit 21, and display control of the EVF display panel 25 and the back panel 27. The ASIC 36 totally controls the imaging apparatus 1 in accordance with a program recorded in the flash memory 35.

Herein, a configuration of the ASIC 36 will be described in detail.

The ASIC 36 includes at least an A/D converter 360, a mechatronics controller 361, an image processing unit 362, a display controller 363, a USB communication unit 364, an audio unit 365, a memory I/O unit 366, an I/O unit 367, a bus 368, and a control unit 369.

The A/D converter 360 converts an analog signal input from the outside to a digital signal and outputs the converted digital signal to the bus 368. Examples of the analog signal input from the outside include an image signal (image data) input from the imaging unit 21, a temperature measurement signal indicating a temperature of the imaging element 213 input from the temperature measuring sensor 22, a detection signal input from each of the gyro sensor 231, the acceleration sensor 232, the light control sensor 233, the temperature sensor 234, and the relative humidity sensor 235, and a temperature signal indicating a battery temperature from the battery temperature detection sensor 31a.

The mechatronics controller 361, under control of the control unit 369, drives the lens driving unit 214 so that a focus lens of the image capturing lens 211 is set to a focus position based on a contrast signal generated according to a high frequency component included in image data generated by the imaging unit 21. Also, the mechatronics controller 361 changes a focal distance by driving the lens driving unit 214 and moving a zoom lens of the image capturing lens 211 on an optical axis of the image capturing lens 211 depending on the operation state of the zoom button 6 via the switch unit 32 The mechatronics controller 361, under control of the control unit 369, drives by setting the diaphragm 212 and a shutter speed of a shutter (not illustrated) by driving the diaphragm mechanism 215 based on an exposure control value.

The image processing unit 362 performs predetermined image processing to image data input from the imaging unit 21 via the A/D converter 360 and the bus 368, and outputs the image data to the bus 368. Herein, examples of the predetermined image processing include image processing for displaying a live view, image processing for recording to the recording medium 33, and image processing for playing back image data red out from the recording medium 33. Specifically, optical black subtraction processing, white balance (WB) adjustment processing, color matrix calculation processing, gamma correction processing, color reproduction processing, and edge emphasizing processing are performed to image data generated by the imaging unit 21. The image processing unit 362 generates a contrast signal depending on a high frequency component from image data generated by the imaging unit 21 for AF control by the image capturing lens 211 via the bus 368 and outputs the signal to the control unit 369.

The image processing unit 362 includes an evaluation value calculation unit 362a, a determination unit 362b, and a light emission controller 362c.

The evaluation value calculation unit 362a calculates a contrast evaluation value of each of first image data in which an object input from the outside is imaged and second image data in which an object is imaged by emitting auxiliary light to the object from the auxiliary light emitting unit 15. Specifically, the evaluation value calculation unit 362a calculates a contrast evaluation value of each of a live view image (the first image data) generated by the imaging unit 21 and image data (the second image data) generated by the imaging unit 21 when the auxiliary light emitting unit 15 has emitted auxiliary light to an object after a first release signal has been input by operating the release button 4. In the present embodiment, the contrast evaluation value becomes higher when an image is clear and becomes lower when an image is not clear.

The determination unit 362b determines that fog or haze is occurring if a contrast evaluation value of the first image data calculated by the evaluation value calculation unit 362a is equal to or greater than a contrast evaluation value of the second image data. Also, the determination unit 362b determines whether a contrast evaluation value of the first image data calculated by the evaluation value calculation unit 362a is equal to or less than a predetermined threshold. Herein, the threshold is a contrast evaluation value of image data obtained when an object is imaged at an appropriate exposure value when the object is captured.

The light emission controller 362c outputs an inhibition signal for inhibiting emission of auxiliary light from the auxiliary light emitting unit 15 in the case where the determination unit 362b determines that fog or haze is occurring. In the case where the determination unit 362b determines that fog or haze is not occurring, an instruction signal for instructing emission of auxiliary light to the auxiliary light emitting unit 15 is output when an image capturing instruction signal for capturing an object is input from the outside.

The display controller 363 outputs, to the EVF panel display controller 26 or the back panel display controller 28, a live view image or a playback image corresponding to image data, in which image processing is performed by the image processing unit 362, and a menu image. The display controller 363 determines to where image data is output depending on an operation state of the switch unit 32 via the I/O unit 367.

The USB communication unit 364 communicates with an external device via a USB terminal (not illustrated) provided to the imaging apparatus 1.

The audio unit 365 performs audio processing to an audio signal input from a microphone (not illustrated) and records the audio signal with still image data and moving image data to the recording medium 33. Also, the audio unit 365 plays back a sound by performing the audio processing to the audio signal recorded in the recording medium 33 and outputting the audio signal to a speaker (not illustrated).

The memory I/O unit 366 is an interface to write and read data in the SDRAM 34.

The I/O unit 367 is an interface to perform writing and reading data and outputting a control instruction with each circuit in the ASIC 36 via the bus 368 with respect to each of the touch panel 29, the power source unit 30, the switch unit 32, the recording medium 33, and the auxiliary light emitting unit 15.

The bus 368 is a transmission channel for connecting each configuration unit of the ASIC 36 and transfers each type of data issued in the ASIC 36 to each configuration unit of the ASIC 36.

The control unit 369 generally controls an operation of the imaging apparatus 1 by transferring an instruction and data with respect to each unit included in the imaging apparatus 1 based on a program recorded in the flash memory 35. The control unit 369 includes an image processing controller 369a and an imaging controller 369b.

The image processing controller 369a changes a content of image processing performed by the image processing unit 362 based on a determination result of the determination unit 362b. Specifically, in the case where the determination unit 362b determines that fog or haze is occurring, the image processing controller 369a changes from image processing performed to image data by the image processing unit 362 to fog/haze correction processing for correcting fog or haze.

The imaging controller 369b controls an image capturing operation of the imaging apparatus 1. Specifically, the imaging controller 369b drives the lens driving unit 214 and causes the lens driving unit 214 to adjust a focus position in the case where an image capturing preparation signal (hereinafter called "a first release signal") to instruct an image capturing preparation operation is input from the release button 4. In the case where an image capturing instruction signal (hereinafter called "a second release signal") to instruct image capturing is input from the release button 4, the imaging controller 369b causes the imaging unit 21 to perform image capturing.

Figure 4:
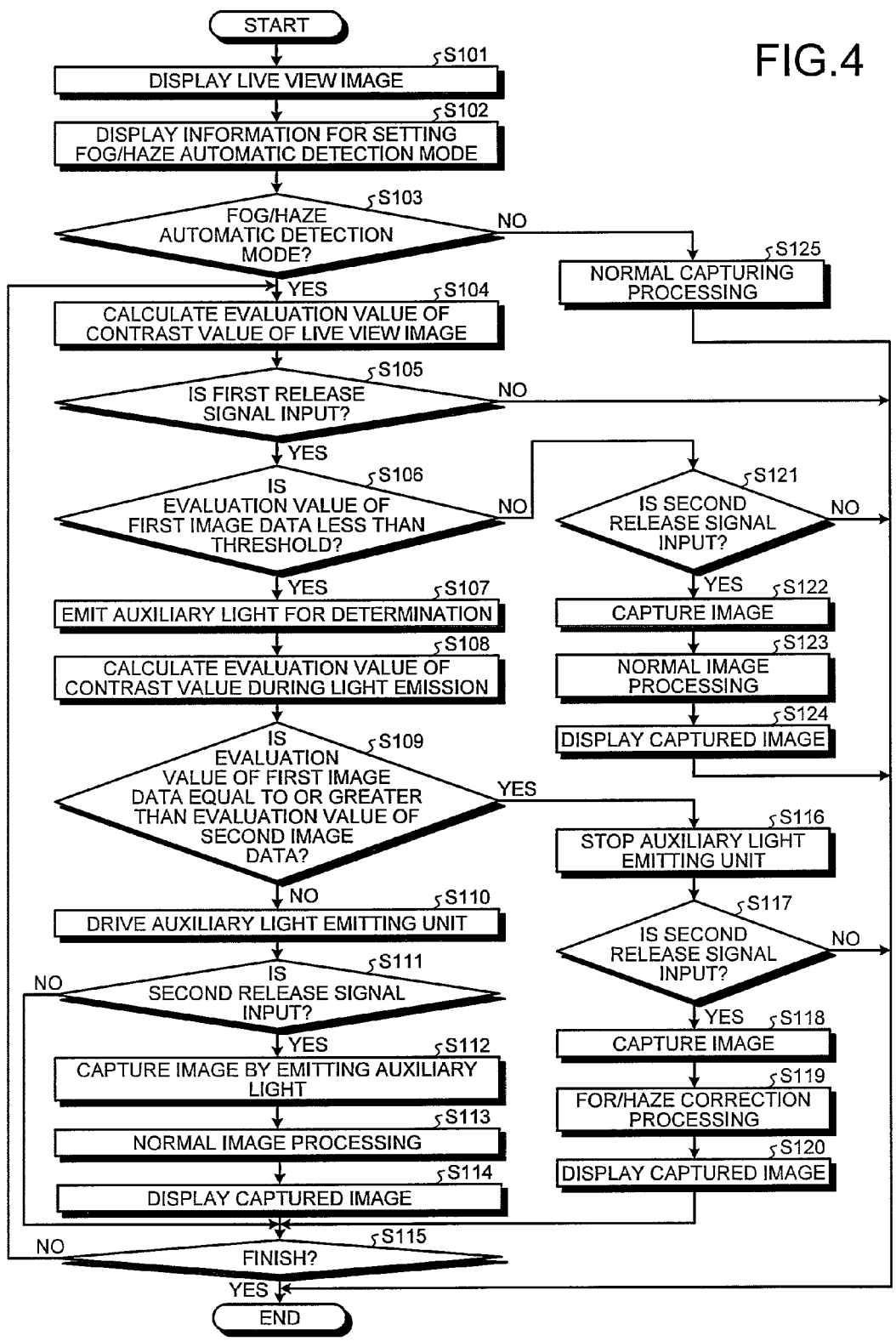
FIG. 4 is a flowchart illustrating an outline of processing performed by the imaging apparatus according to the first embodiment of the present invention.

An outline of processing performed by the imaging apparatus 1 configured as above will be described. FIG. 4 is a flowchart illustrating an outline of processing performed by the imaging apparatus 1.

As illustrated in FIG. 4, first, the display controller 363 displays live view image corresponding to image data generated by the imaging unit 21 on the EVF display panel 25 or the back panel 27 (step S101). Hereinafter, an example in which a live view image is displayed on the back panel 27 will be described to simplify a description.

Figure 5:
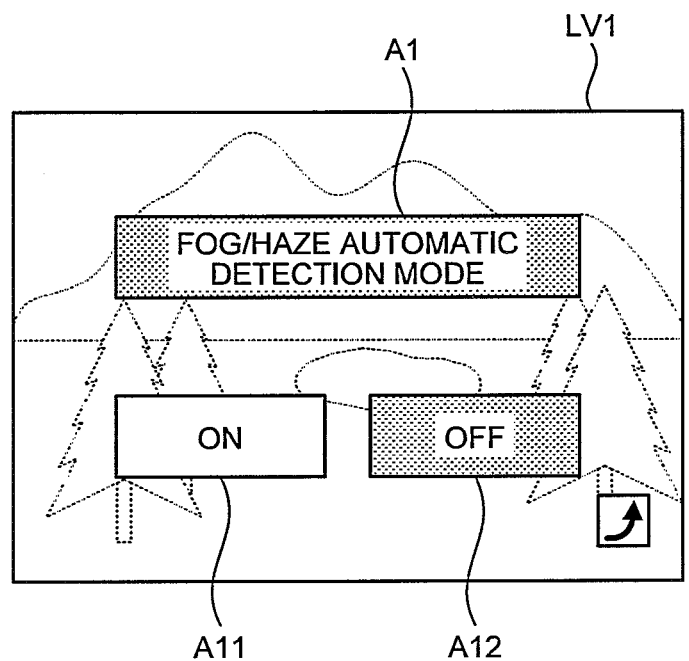
FIG. 5 is a view illustrating an example of information for setting a fog/haze automatic detection mode, which is displayed by the imaging apparatus according to the first embodiment of the present invention.

Next, the display controller 363 displays information for setting a fog/haze automatic detection mode by superimposing on a live view image displayed by the back panel 27 (step S102). Specifically, as illustrated in FIG. 5, the display controller 363 displays a fog/haze automatic detection mode icon A1, an ON icon A11 for receiving input of an instruction signal for instructing a fog/haze automatic detection mode, and an OFF icon A12 for receiving input of an instruction signal for stopping the fog/haze automatic detection mode by superimposing each of them on a live view image LV1 displayed by the back panel 27.

Figure 6:
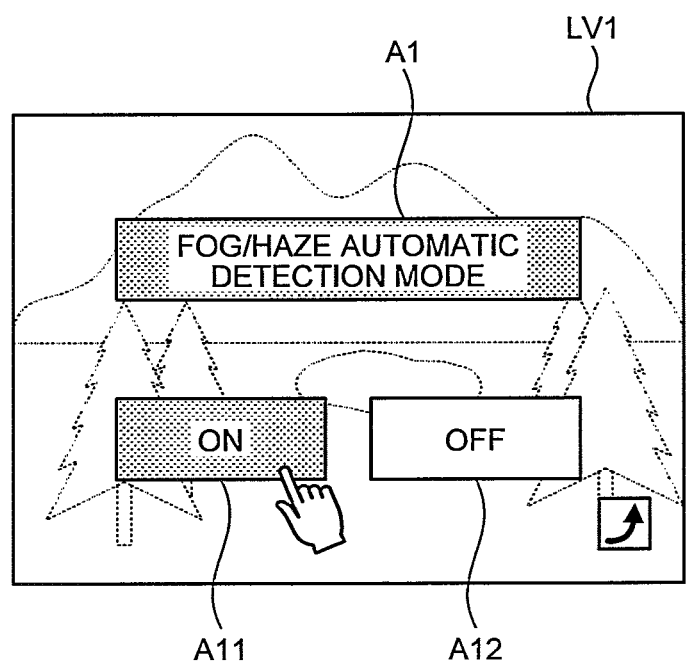
FIG. 6 is a view schematically describing a method for setting a fog/haze automatic detection mode with respect to the imaging apparatus according to the first embodiment of the present invention.

Then, the control unit 369 determines via the touch panel 29 or the switch unit 32 whether the ON icon A11 is selected (step S103). For example, as illustrated in FIG. 6, when the ON icon A11 is selected via the touch panel 29 or the switch unit 32, the control unit 369 determines whether the fog/haze automatic detection mode is selected. In the case where the control unit 369 determines that the fog/haze automatic detection mode is selected when the ON icon A11 is selected via the touch panel 29 or the switch unit 32 (step S103: Yes), the imaging apparatus 1 proceeds to the step S104 to be described later. On the other hand, in the case where the control unit 369 determines that the fog/haze automatic detection mode is not selected when the OFF icon A12 is selected via the touch panel 29 or the switch unit 32 (step S103: No), the imaging apparatus 1 proceeds to step S125 to be described later.

In step S104, the evaluation value calculation unit 362a calculates a contrast evaluation value of image data generated by the imaging unit 21.

Figure 7:
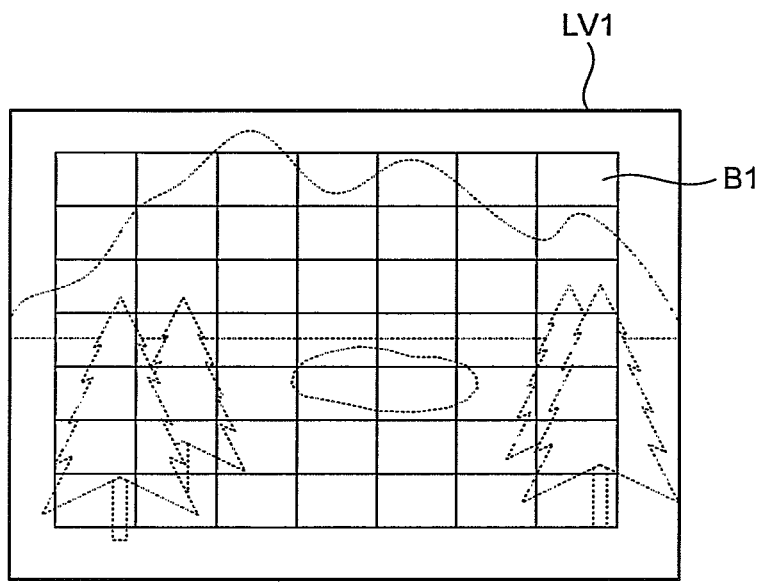
FIG. 7 is a view illustrating an outline of a calculation method for calculating a contrast evaluation value by an evaluation value calculation unit of the imaging apparatus according to the first embodiment of the present invention.

FIG. 7 is a view illustrating an outline of a calculation method for calculating a contrast evaluation value by the evaluation value calculation unit 362a.

As illustrated in FIG. 7, the evaluation value calculation unit 362a divides the live view image LV1 corresponding to image data generated by the imaging unit 21 into multiple areas, and calculates a contrast evaluation value of each of the multiple areas B1. Then, the evaluation value calculation unit 362a calculates a contrast evaluation value of the live view image LV1 by adding a contrast evaluation value of each of the areas B1. In FIG. 7, the evaluation value calculation unit 362a divides a predetermined area on the live view image LV1 into multiple areas, but it is not limited to the predetermined areas. The evaluation value calculation unit 362a may calculate a contrast evaluation value with respect to the entire area of the live view image LV1, may calculate the contrast evaluation value by changing and allocating weighting of an AF area on the live view image LV1; for example, a single AF area and a group AF area, and may statistically calculate the contrast evaluation value from an average value of each area by controlling the areas for each group. The evaluation value calculation unit 362a may calculate based on a statistical method so as to calculate a contrast evaluation value by changing weighting for each area depending on an average luminance and a luminance distribution of an object. Hereinafter, a contrast evaluation value of the live view image LV1 is referred to an evaluation value of first image data.

After step S104, in the case where a first release signal is input from the release button 4 when the release button 4 is half-depressed (step S105: Yes) and the determination unit 362b determines that the evaluation value of the first image data calculated by the evaluation value calculation unit 362a is equal to or less than a threshold (step S106: Yes), the light emission controller 362c outputs an emission instruction signal to the auxiliary light emitting unit 15 for causing the auxiliary light emitting unit 15 to emit auxiliary light for determination to an object and causes the auxiliary light emitting unit 15 to emit auxiliary light (pre-emission) for determination to an object (step S107). In this case, the imaging unit 21 temporarily records image data, in which the object subjected to emission of the auxiliary light is imaged, in the SDRAM 34.

Subsequently, the evaluation value calculation unit 362a calculates a contrast evaluation value of an image corresponding to image data generated by the imaging unit 21 when the auxiliary light emitting unit 15 emits the auxiliary light to the object (step S108). Hereinafter, a contrast evaluation value of an image corresponding to the image data generated by the imaging unit 21 when the auxiliary light emitting unit 15 emits auxiliary light to an object is referred to an evaluation value of second image data.

Then, the determination unit 362b determines whether the contrast evaluation value of the first image data calculated by the evaluation value calculation unit 362a in step S106 is equal to or greater than the contrast evaluation value of the second image data calculated by the evaluation value calculation unit 362a in step S108. (step S109).

Figure 8A:
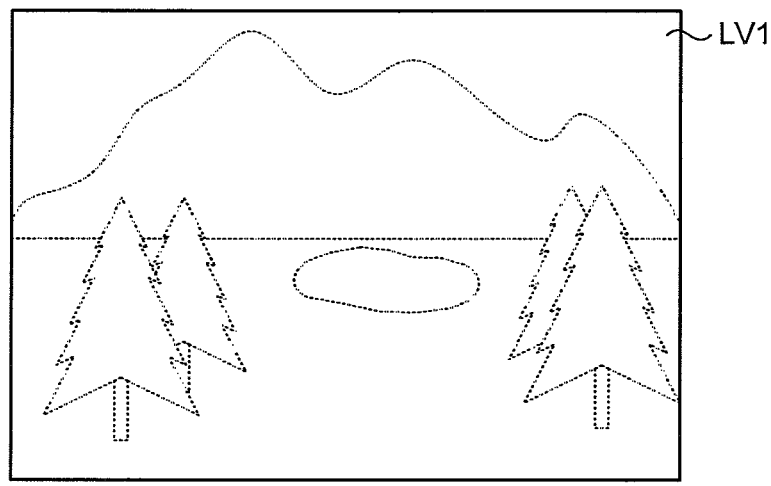
FIG. 8A is a view illustrating an example of an image captured by the imaging apparatus according to the first embodiment of the present invention by emitting auxiliary light when fog or haze is occurring.
Figure 8B:
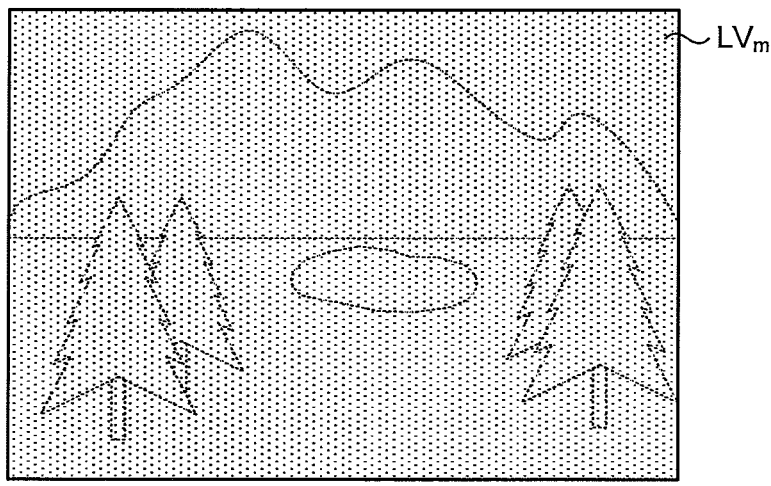
FIG. 8B is a view illustrating an example of an image captured by the imaging apparatus according to the first embodiment of the present invention by emitting auxiliary light when fog or haze is occurring.
Figure 9A:
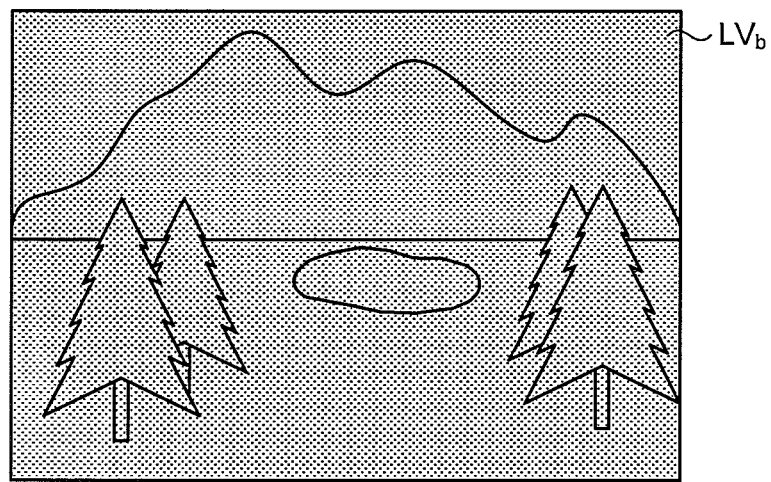
FIG. 9A is a view illustrating an example of an image captured by the imaging apparatus according to the first embodiment of the present invention by emitting auxiliary light at night.
Figure 9B:
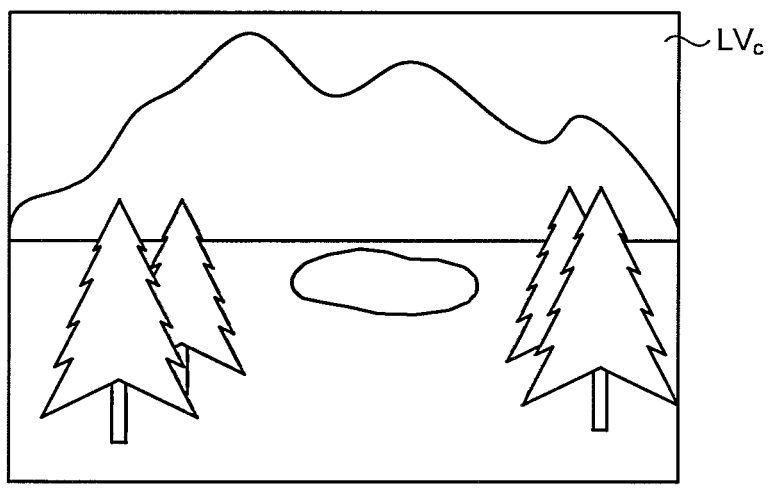
FIG. 9B is a view illustrating an example of an image captured by the imaging apparatus according to the first embodiment of the present invention by emitting auxiliary light at night.

FIGS. 8A and 8B are views illustrating an example of an image captured by the imaging apparatus 1 by emitting auxiliary light when fog or haze is occurring. FIGS. 9A and 9B are view illustrating an example of an image captured by the imaging apparatus 1 by emitting auxiliary light at night. In FIGS. 8A and 8B, fog or haze is indicated with dots. Also, in FIGS. 9A and 9B, night time is indicated by hatching.

As illustrated in FIG. 8A, in the case where the imaging apparatus 1 captures an image by emitting auxiliary light to an object while fog or haze is occurring (FIG. 8A), the auxiliary light is irregularly reflected due to the fog or haze, and halation occurs on the imaged image, and the image becomes a low contrast image $LV_m$ (FIG. 8B). In this case, a contrast evaluation value (a first evaluation value) of the image LV1 in the case where the auxiliary light emitting unit 15 has not emitted auxiliary light is equal to or greater than a contrast evaluation value (a second evaluation value) of the image $LV_m$ in the case where the auxiliary light emitting unit 15 has emitted auxiliary light. Herein, according to the determination criteria of the Meteorological Agency in Japan, fog is a phenomenon in which small droplets are floating close to the ground and a case where visibility is less than 1 km. Also, haze is a phenomenon in which small droplets are floating close to the ground and a case where visibility is 1 km or more and less than 10 km.

On the other hand, as illustrated in FIG. 9A, in the case where the imaging apparatus 1 captures an image at night (FIG. 9A) and the image is captured by emitting auxiliary light to an object, the captured image become an image $LV_c$ with an appropriate exposure value (FIG. 9B) by emitting auxiliary light to the object in comparison with the image $LV_b$ captured before auxiliary light is emitted. In this case, a contrast evaluation value of the image $LV_b$ in the case where the auxiliary light emitting unit 15 has not emitted auxiliary light (the first evaluation value) becomes less than a contrast evaluation value of the image $LV_c$ in the case where the auxiliary light emitting unit 15 has emitted auxiliary light (the second evaluation value).

Therefore, in the case where the determination unit 362b determines that, in comparison between the first evaluation value and the second evaluation value, the first evaluation value is equal to or greater than the second evaluation value, the determination unit 362b determines that fog or haze is occurring. Also, in the case where the determination unit 362b determines that the first evaluation is less than the second evaluation value, the determination unit 362b determines that fog or haze is occurring. In other words, the determination unit 362b determines that the object is captured at night, in the dark, or underexposed. In this manner, the determination unit 362b determines whether fog or haze is occurring during image capturing by determining a large-and-small relation between an evaluation value of the first image data and an evaluation value of the second image data.

In step S109, in the case where the determination unit 362b determines that a contrast evaluation value of the first image data is equal to or greater than a contrast evaluation value of the second image data (step S109: Yes), the imaging apparatus 1 proceeds to step S116 to be described later. On the other hand, in the case where the determination unit 362b determines that a contrast evaluation value of the first image data is less than a contrast evaluation value of the second image data (step S109: No), the imaging apparatus 1 proceeds to step S110 to be described later.

In step S110, the light emission controller 362c stores information for inhibiting auxiliary light emission as ON (valid, for example, a value is 1), and drives the auxiliary light emitting unit 15 by outputting a driving signal to the auxiliary light emitting unit 15 for driving the auxiliary light emitting unit 15. In this case, the auxiliary light emitting unit 15 waits until a second release signal for instructing image capturing is input from the release button 4.

Next, in the case where the second release signal is input by fully depressing the release button 4 (step S111: Yes), the imaging controller 369b causes the auxiliary light emitting unit 15 to emit auxiliary light and causes the imaging unit 21 to capture an image based on the information for inhibiting auxiliary light emission (step S112). In this case, the auxiliary light emitting unit 15 is synchronized with the second release signal and emits auxiliary light to an object. Specifically, an image capturing timing of the imaging unit 21 and a timing of auxiliary light emission are synchronized.

Then, the image processing unit 362 performs normal image processing to image data generated by the imaging unit 21 and outputs the data to the recording medium 33 (step S113).

Next, the display controller 363 causes the back panel 27 to display a captured image corresponding to image data in which image processing is performed by the image processing unit 362 (step S114).

Then, in the case where the imaging apparatus 1 finishes capturing an image when the power button 3 is operated (step S115: Yes), the imaging apparatus 1 finishes the processing. On the other hand, in the case where the power button 3 is not operated (step S115: No), the imaging apparatus 1 returns to step S104.

In step S111, in the case where the release button 4 is not fully depressed, and the second release signal is not input (step S111: No), the imaging apparatus 1 proceeds to step S115.

In step S116, the light emission controller 362c stores information for inhibiting auxiliary light emission as OFF (invalid, for example, a value is "0"), and stops the auxiliary light emitting unit 15 by outputting an inhibition signal to the auxiliary light emitting unit 15 for inhibiting driving the auxiliary light emitting unit 15. Therefore, the auxiliary light emitting unit 15 does not emit auxiliary light to an object even if the second release signal is input from the release button 4.

Next, in the case where the second release signal is input by fully depressing the release button 4 (step S117: Yes), an auxiliary light emission signal is not input based on the information for inhibiting auxiliary light emission. The imaging controller 369b causes the imaging unit 21 to capture an image (step S118).

Figure 10:
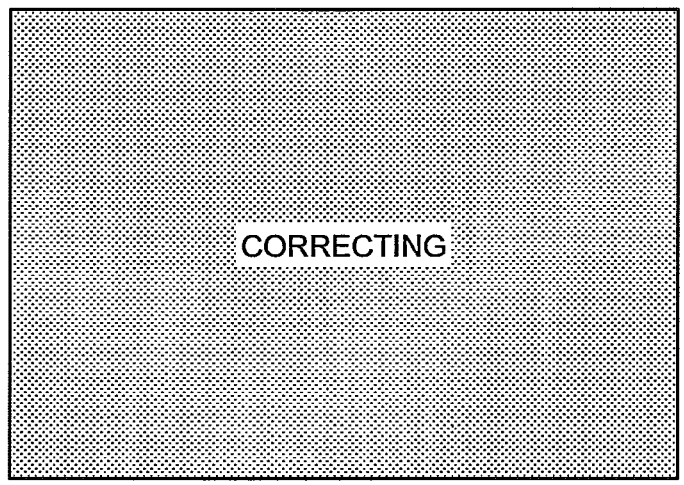
FIG. 10 is a view illustrating an example of a screen which indicates that correction is undergoing by an image processing unit and is displayed by the imaging apparatus according to the first embodiment of the present invention.
Figure 11A:
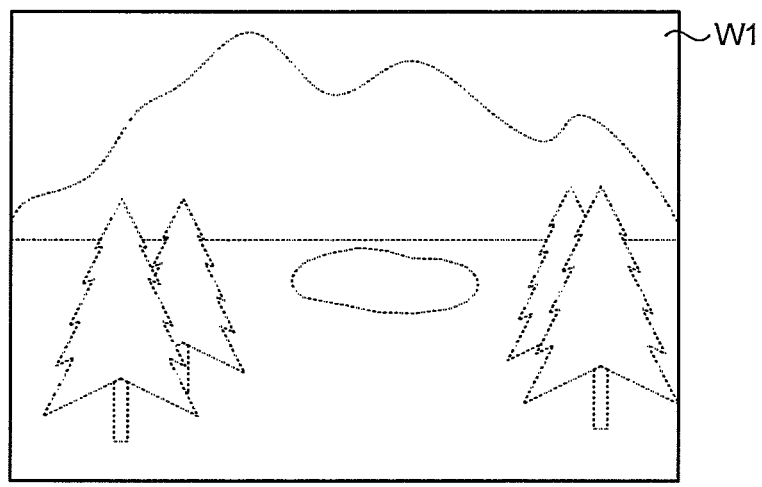
FIG. 11A is a view illustrating an example of image data subjected to fog/haze correction processing by the image processing unit according to the first embodiment of the present invention.
Figure 11B:
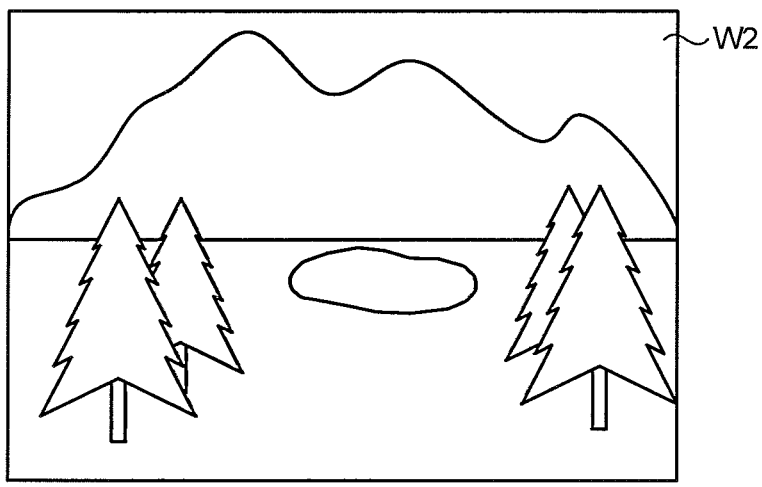
FIG. 11B is a view illustrating an example of image data subjected to the fog/haze correction processing by the image processing unit according to the first embodiment of the present invention.

Then, the image processing controller 369a causes the image processing unit 362 to perform fog/haze correction processing to image data generated by the imaging unit 21 (step S119). In this case, the display controller 363, as illustrated in FIG. 10, causes the back panel 27 to display information indicating that the fog/haze correction processing is performed. Examples of the fog/haze correction processing herein include edge emphasizing processing for emphasizing an edge of image data, color saturation processing for improving color saturation, and contrast processing for increasing a contrast. Specifically, as illustrated in FIGS. 11A and 11B, the image processing unit 362 corrects to an image W2 in which an outline, color saturation, and a contrast of an object are emphasized by performing the fog/haze correction processing to an image W1 corresponding to foggy or hazy image data (FIG. 11A→FIG. 11B). In this manner, thoroughly sharp and clear image can be obtained.

Next, the display controller 363 causes the back panel 27 to display a captured image corresponding to image data in which the fog/haze correction processing is performed by the image processing unit 362 (step S120). Specifically, as illustrated in FIG. 11B, the display controller 363 causes the back panel 27 to display the image W2. After step S120, the imaging apparatus 1 proceeds to step S115.

In step S117, in the case where the release button 4 is not fully depressed, and the second release signal is not input (step S117: No), the imaging apparatus 1 finishes the processing.

In step S105, in the case where the first release signal is input from the release button 4 by half-depressing the release button 4 (step S105: Yes), when the determination unit 362b determines that an evaluation value of the first image data calculated by the evaluation value calculation unit 362a is not equal to or less than a threshold (step S106: No), the imaging apparatus 1 proceeds to step S121.

Next, in the case where the second release signal is input by fully depressing the release button 4 (step S121: Yes), the imaging controller 369b causes the imaging unit 21 to capture an image (step S122).

Then, the image processing controller 369a causes the image processing unit 362 to perform normal image processing to image data generated by the imaging unit 21 (step S123).

Next, the display controller 363 causes the EVF display panel 25 or the back panel 27 to display a captured image corresponding to image data in which image processing is performed by the image processing unit 362 (step S124). After step S124, the imaging apparatus 1 finishes the processing.

In step S121, in the case where the release button 4 is not fully depressed, and the second release signal is not input (step S121: No), the imaging apparatus 1 finishes the processing.

In step S125, the imaging apparatus 1 performs normal capturing processing in which the imaging unit 21 captures an image depending on an operation of the release button 4. After step S125, the imaging apparatus 1 finishes the processing.

In step S105, in the case where the release button 4 is not half-depressed, and the first release signal is not input (step S105: No), the imaging apparatus 1 finishes the processing.

According to the first embodiment of the present invention described above, the evaluation value calculation unit 362a calculates each evaluation value of the first image data and the second image data, and the determination unit 362b determines that fog or haze is occurring in the case where the first evaluation value is equal to or greater than the second evaluation value. In this manner, fog or haze can be determined when an image is captured.

Furthermore, according to the first embodiment of the present invention, in the case where the determination unit 362b determines that fog or haze is occurring, the light emission controller 362c outputs an inhibition signal for inhibiting auxiliary light emission to the auxiliary light emitting unit 15, and therefore halation on an captured image due to reflection of fog or haze can be certainly prevented.

Also, according to the first embodiment of the present invention, in the case where the determination unit 362b determines that fog or haze is not occurring, the light emission controller 362c outputs an instruction signal for instructing auxiliary light emission to the auxiliary light emitting unit 15, and therefore an image obtained by an appropriate exposure value can be captured.

Also, according to the first embodiment of the present invention, in the case where the determination unit 362b determines that a contrast evaluation value of a live view image is equal to or less than a predetermined threshold, the light emission controller 362c outputs an instruction signal for instructing auxiliary light emission to the auxiliary light emitting unit 15 before a still image of an object is captured, and the auxiliary light is not emitted to the object of high luminance and under a light environment. Therefore a clear image with an appropriate exposure value can be captured.

In the case where the first release signal is input from the release button 4, for example, an AF auxiliary light of the auxiliary light emitting unit 15 may be emitted to an object although the light emission controller 362c causes the auxiliary light emitting unit 15 to emit auxiliary light in the first embodiment of the present invention.

In the first embodiment of the present invention, although the determination unit 362b determines whether fog or haze is occurring based on evaluation values of the first image data and the second image data, which have been calculated by the evaluation value calculation unit 362a, the determination unit 362b may determine whether fog or haze is occurring based on a detection result detected by the temperature sensor 234 and a detection result detected by the relative humidity sensor 235. Also, an occurrence probability of fog or haze is calculated, and the fog/haze automatic detection mode may be automatically selected when the probability is high. It is generally known that the occurrence probability of fog or haze increases when a relative humidity exceeds 70%.

Second Embodiment

A second embodiment of the present invention will be described next. An imaging apparatus according to the second embodiment includes a configuration similar to that of the imaging apparatus 1 according to the first embodiment described above, and different processing is performed. Therefore, processing performed by the imaging apparatus according to the second embodiment will be described below. A configuration similar to that of the imaging apparatus 1 according to the above-described first embodiment will be denoted with the same signs, and a description thereof will be omitted.

Figure 12:
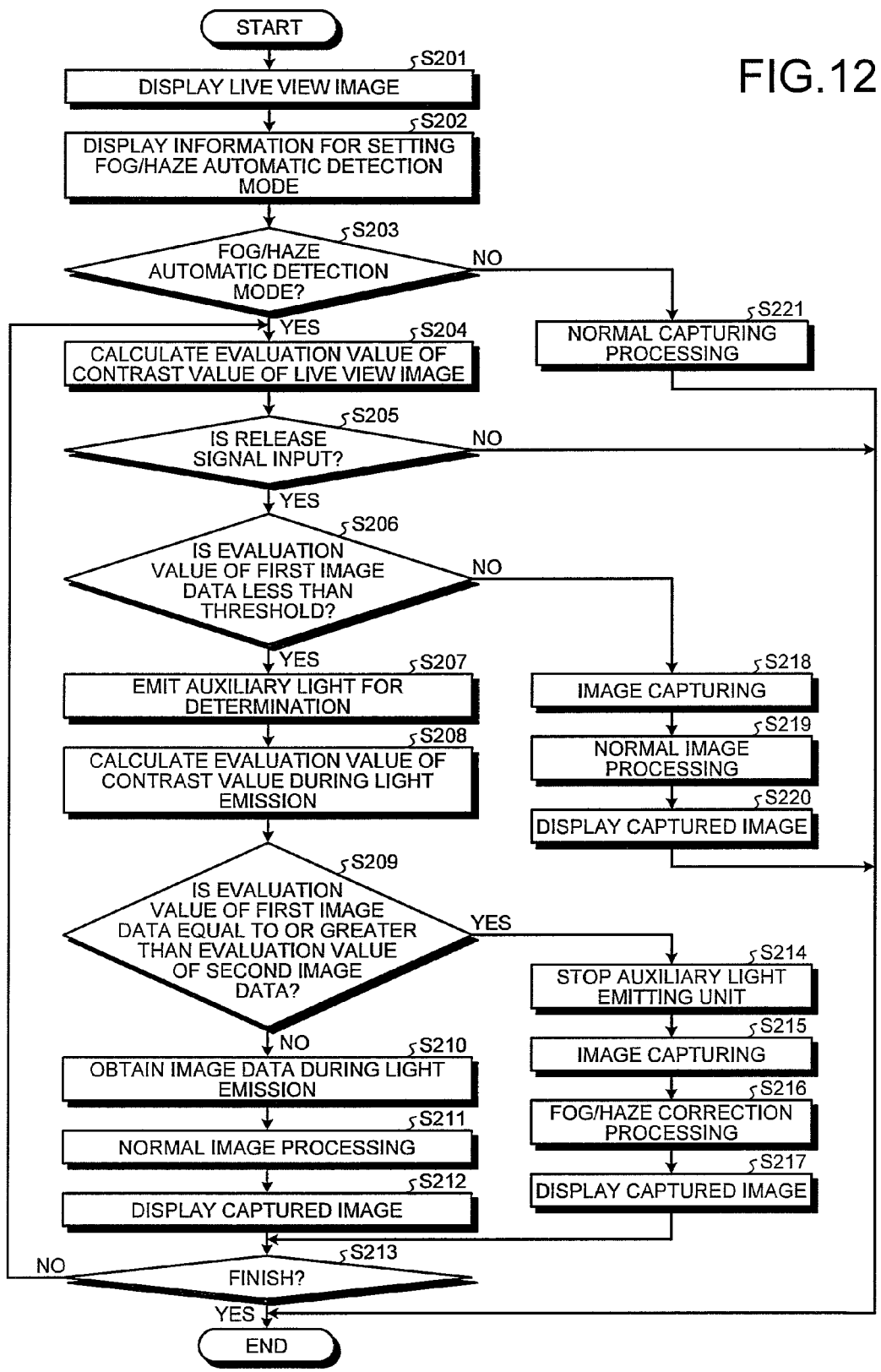
FIG. 12 is a flowchart illustrating an outline of processing performed by an imaging apparatus according to a second embodiment of the present invention.

FIG. 12 is a flowchart illustrating an outline of processing performed by the imaging apparatus 1 according to the second embodiment of the present invention. Steps S201 to S204 in FIG. 12 are corresponding steps S101 to S104 in FIG. 4 described above.

In step S205, in the case where a release button 4 is fully depressed, and a release signal for instructing capturing an image is input (step S205: Yes), the imaging apparatus 1 proceeds to step S206. On the other hand, in the case where the release button 4 is not fully depressed, and the release signal for instructing capturing an image is not input (step S205: No), the imaging apparatus 1 proceeds to step S213 to be described later.

Steps S206 to S209 are respectively corresponding to steps S106 to S109 in FIG. 4 described above.

In step S210, the image processing unit 362 obtains image data generated by an imaging unit 21 when an auxiliary light emitting unit 15 temporarily recorded in the SDRAM 34 emits auxiliary light, and information for inhibiting auxiliary light emission (for example, auxiliary light emission is ON). In this manner, a user can obtain an image captured at an appropriate exposure value by one release operation. Furthermore, the auxiliary light emitting unit 15 emits auxiliary light one time, the user can obtain an image certainly capturing an object without missing a shutter timing.

Steps S211 to S214 are respectively corresponding to steps S113 to S116 in FIG. 4 described above.

In step S215, the imaging controller 369b causes the imaging unit 21 to perform image capturing. After step S215, the imaging apparatus 1 proceeds to step S216.

Steps S216 to S221 are respectively corresponding to steps S119, S120, and S122 to S125 in FIG. 4 described above.

According to the second embodiment of the present invention described above, in the case where the release button 4 is operated and a determination unit 362b determines that an evaluation value of the first image data is less than an evaluation value of the second image data, in other words, in the case where the determination unit 362b determines that fog or haze is not occurring, second image data temporarily stored in the SDRAM 34 is recorded in a recording medium 33, and therefore an image with an appropriate exposure value can be captured by one image capturing operation.

Third Embodiment

A third embodiment of the present invention will be described next. An imaging apparatus according to the third embodiment has a configuration different from that of the imaging apparatus 1 according to the first embodiment described above, and different processing is performed. Specifically, although fog/haze has been determined in the first and second embodiments, the imaging apparatus according to the third embodiment determines rain/snow in conjunction with determination of fog/haze. Therefore, after a configuration of the imaging apparatus according to the third embodiment is described, processing performed by the imaging apparatus according to the third embodiment will be described herein. A configuration similar to that of the imaging apparatus 1 according to the first embodiment described above will be denoted with the same sign.

Figure 13:
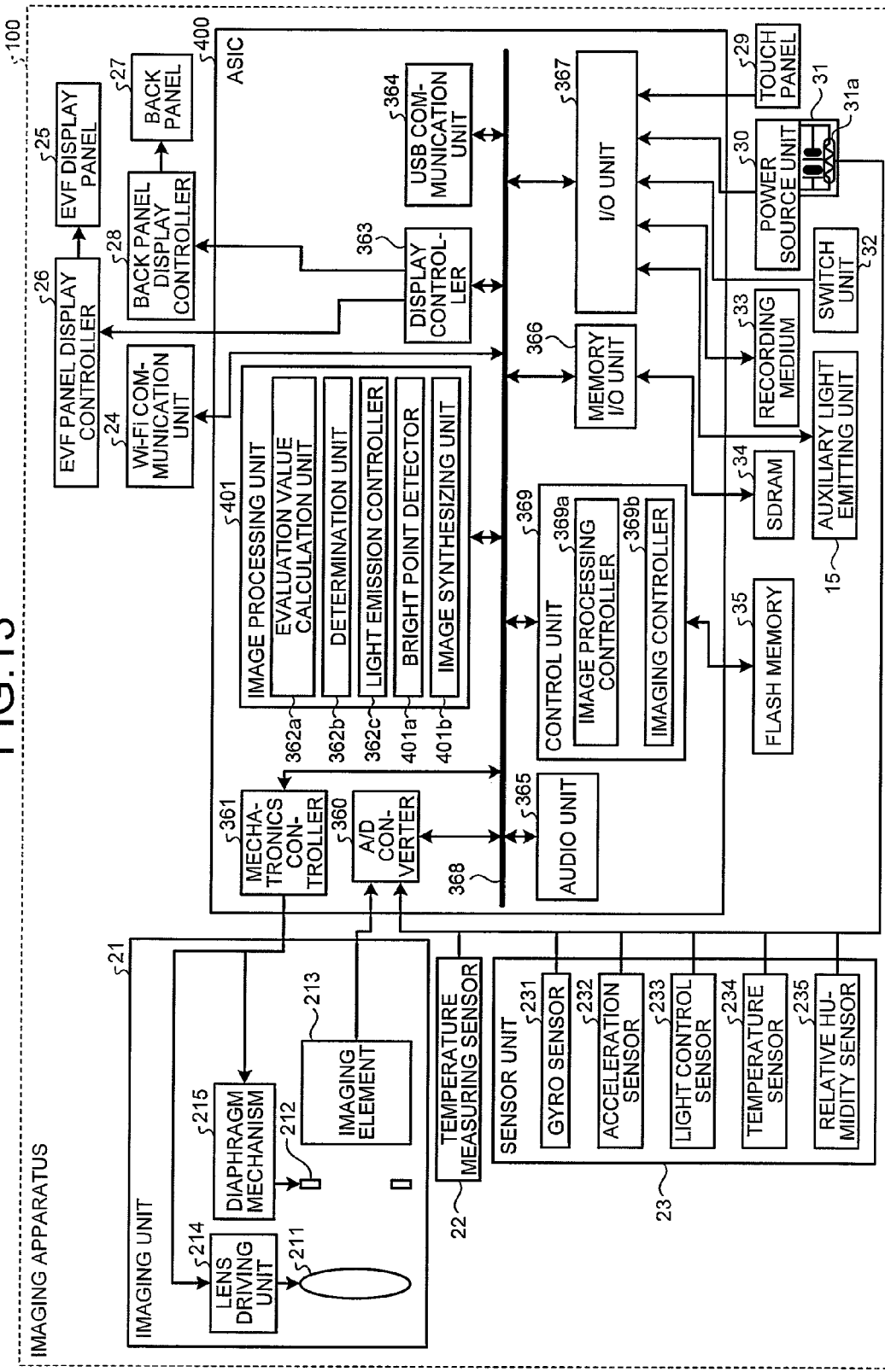
FIG. 13 is a block diagram illustrating a function configuration of an imaging apparatus according to the third embodiment of the present invention.

FIG. 13 is a block diagram illustrating a function configuration of the imaging apparatus according to the third embodiment. As illustrated in FIG. 13, an imaging apparatus 100 includes an ASIC 400 instead of the ASIC 36.

The ASIC 400 includes an image processing unit 401 instead of the image processing unit 362. The image processing unit. 401 includes an evaluation value calculation unit 362a, a determination unit 362b, a light emission controller 362c, a bright point detector 401a, and an image synthesizing unit 401b.

The bright point detector 401a detects a bright point included in an image corresponding to image data generated by the imaging unit 21. Specifically, the bright point detector 401a detects an area over a predetermined bright point in an image corresponding to the image data generated by the imaging unit 21. The bright point detector 401a may detect a bright point by pattern matching. The bright point detector 401a may detect, as a bright point, a moving object which moves among image data continuously generated by the imaging unit 21.

The image synthesizing unit 401b generates synthesized image data in which multiple image data are synthesized. Specifically, the image synthesizing unit 401b generates synthesized image data in which image data temporarily stored in the SDRAM 34 and image data generated by the imaging unit 21 are synthesized.

Figure 14:
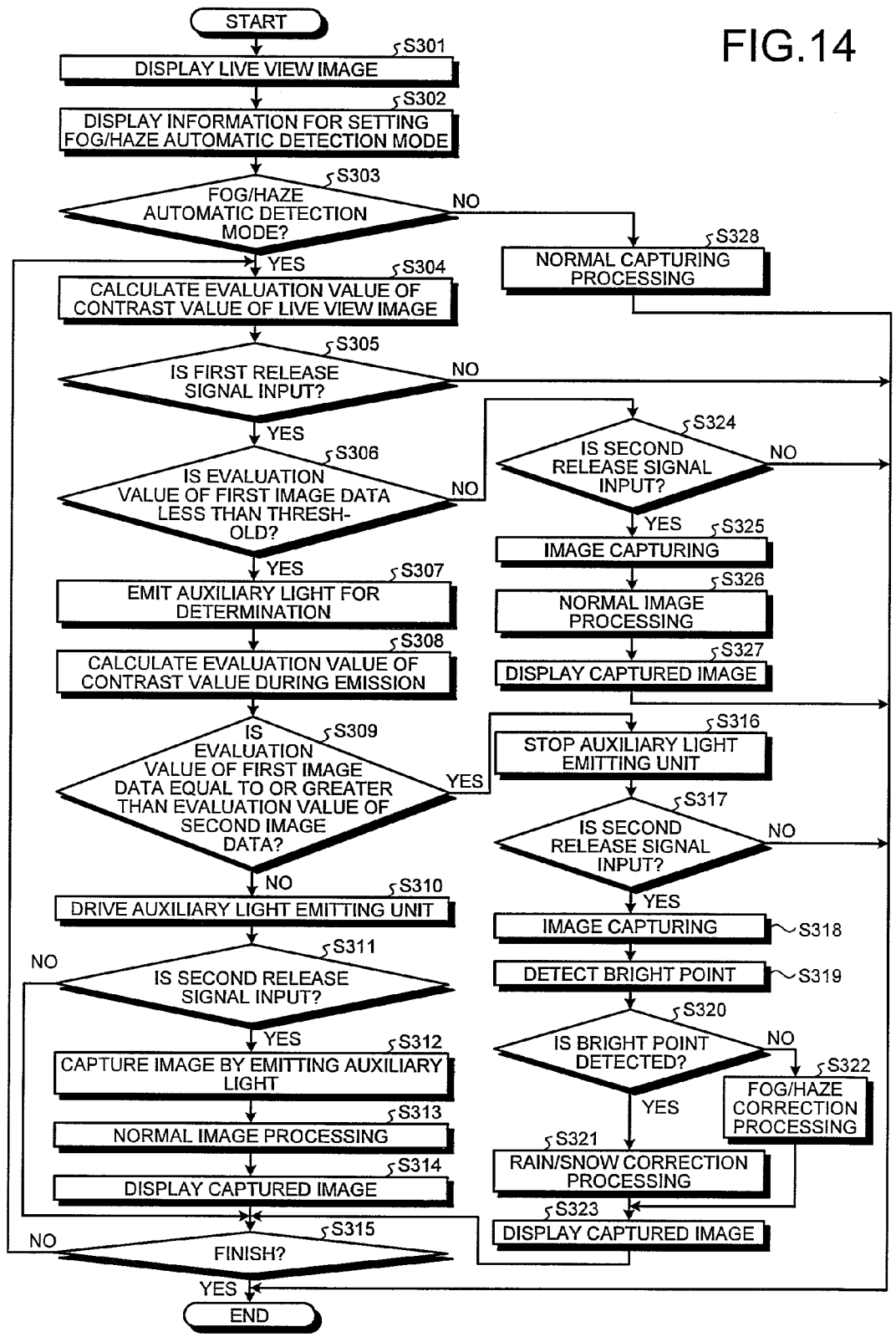
FIG. 14 is a flowchart illustrating an outline of processing performed by the imaging apparatus according to the third embodiment of the present invention.

Processing performed by the imaging apparatus 100 including the above configuration will be described. FIG. 14 is a flowchart illustrating an outline of processing performed by the imaging apparatus 100.

In FIG. 14, steps S301 to S318 are corresponding to steps S101 to S118 in FIG. 4 described above.

Figure 15:
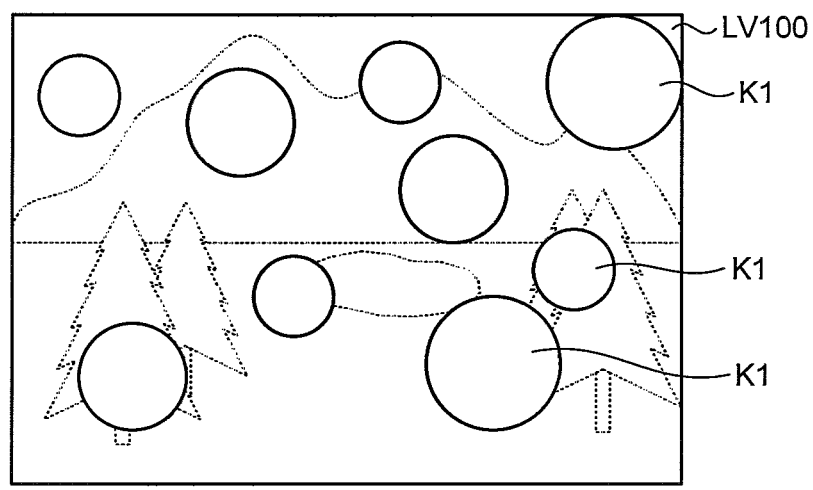
FIG. 15 is a view illustrating an example of an image in which rain or snow is captured by the imaging apparatus according to the third embodiment of the present invention.

In step S319, the bright point detector 401a detects a bright point included in an image corresponding to image data generated by the imaging unit 21. Specifically, as illustrated in FIG. 15, the bright point detector 401a detects a bright point included in an image LV100 corresponding to image data generated by the imaging unit 21. Herein, bright points K1 are snow or rain. Snow and rain are captured in a state in which a luminance is high in comparison with surrounding objects in the case where an image is imaged by the imaging apparatus 100. Therefore, the bright point detector 401a detects an area having a luminance equal to or greater than a predetermined threshold as a bright point K1 with respect to the image LV100. The bright point detector 401a may detect the bright point K1 included in the image LV100 by pattern matching by using a circle and a predetermined form with respect to the image LV100.

Next, in the case where the bright point detector 401a detects a bright point in an image corresponding to image data generated by the imaging unit 21 (step S320: Yes), the image processing controller 369a causes the image processing unit 401 to perform rain/snow correction processing (step S321). Herein, the rain/snow correction processing is processing for lowering color saturation and an exposure value of the image data generated by the imaging unit 21. Accordingly, rain/snow can be emphasized in a captured image. Also, as the rain/snow correction processing, the image synthesizing unit 401b may generate synthesized image data in which the image data generated by the imaging unit 21 in step S318 and, for example, the image data generated by the imaging unit 21 in step S307 are synthesized. This can prevent that an exposure value of a captured image exceeds an appropriate exposure value. Furthermore, the image synthesizing unit 401b may detect moving objects (snow and rain) moving among images and generate image data in which an area of the detected moving objects is removed, based on an image corresponding to the image data generated by the imaging unit 21 in step S318 and an image corresponding to the image data generated by the imaging unit 21 in step S307. As a result, an image in which rain/snow are removed can be obtained.

Steps S322 to S328 are respectively corresponding to steps S119 to S125 in FIG. 4 described above.

According to the third embodiment described above, fog and haze can be determined, and the bright point detector 401a detects rain or snow as a bright point. Therefore, image processing depending on a state during image capturing can be performed to image data which has been captured.

Other Embodiment

In an imaging apparatus according to the present invention, an auxiliary light emitting unit is integrally formed with respect to a main body. However, for example, the auxiliary light emitting unit may be detachable to a hot shoe of the main body.

Also, although the imaging apparatus according to the present invention includes one auxiliary light emitting unit, for example, the image apparatus can apply to using multiple auxiliary light emitting units capable of wireless communication. In this case, depending on a determination result of a determination unit, auxiliary light may be emitted to an object by dividing into a group which is subjected to auxiliary light and a group which is not subjected to the auxiliary light.

The imaging apparatus according to the present invention is applicable to, other than a digital single-lens reflex camera, for example, a digital camera, a digital video camera, a cell phone having an imaging function, an electronic device such as a tablet portable device, and an apparatus and system remotely operating an imaging apparatus.

In the imaging apparatus according to the present invention, a lens unit may be detachable from a main body or may be integrated with the main body.

A program performed by the imaging apparatus according to the present invention is file data to be installed or to be executed, and provided by being recorded in a recording medium readable by a computer such as a CD-ROM, a flexible disk (FD), a CD-R, a digital versatile disk (DVD), a USB medium, and flash memory.

The program performed by the imaging apparatus according to the present invention may be stored in a computer connected to a network such as the Internet and provided by downloading via the network. A program performed by a display device according to the present invention may be provided or distributed via a network such as the Internet.

In descriptions of flowcharts of the present description, a context of processing between steps is described by using expressions such as "first", "then", and "next". However, an order of processing necessary to implement the present invention is not uniquely determined by such expressions. Specifically, an order of processing in the flowcharts described in the present description can be changed within a consistent range.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus comprising:
    an imaging unit configured to generate image data of an object by imaging the object;

an auxiliary light emitting unit configured to emit auxiliary light to the object;

an evaluation value calculation unit configured to calculate a contrast evaluation value of each of first image data generated by the imaging unit and second image data generated by the imaging unit in a state in which the auxiliary light emitting unit emits auxiliary light to the object;

a determination unit configured to determine that fog or haze is occurring at a time the contrast evaluation value of the first image data, which has been calculated by the evaluation value calculation unit, is equal to or greater than the contrast evaluation value of the second image data; and a light emission controller configured to output an inhibition signal for inhibiting auxiliary light emission to the auxiliary light emitting unit at a time the determination unit determines that the fog or haze is occurring.

2. The imaging apparatus according to claim 1, wherein the evaluation value calculation unit is configured to divide each of a first image corresponding to the first image data and a second image corresponding to the second image data into multiple areas and calculate a contrast evaluation value of the first image data and a contrast evaluation value of the second image data by adding a contrast evaluation value of each area.

3. The imaging apparatus according to claim 1, wherein
the determination unit is configured to determine whether the contrast evaluation value of the first image data is equal to or less than a predetermined threshold, and
the light emission controller is configured to output an irradiation instruction signal for causing the auxiliary light emitting unit to emit auxiliary light before the imaging apparatus captures the object at a time the determination unit determines that the contrast evaluation value of the first image data is equal to or less than the predetermined threshold.

4. The imaging apparatus according to claim 1, further comprising,
an input unit configured to receive input of an image capturing instruction signal for instructing capturing an image to the imaging unit, wherein
the light emission controller outputs an emission instruction signal for instructing auxiliary light emission to the auxiliary light emitting unit at a time the input unit inputs the image capturing instruction signal in the case where the determination unit determines that the fog or haze is not occurring.

5. The imaging apparatus according to claim 4, further comprising
an imaging controller configured to cause the imaging unit to perform capturing an image in the case where the image capturing instruction signal is input from the input unit, wherein
the input unit can receive input of either of an image capturing preparation signal for instructing an image capturing preparation operation by an operation from the outside or the image capturing instruction signal,
the light emission controller outputs the light emission instruction signal to the auxiliary light emitting unit in the case where the input unit has input the image capturing preparation signal, and
the imaging controller causes the imaging unit to generate the second image data by synchronizing a light emission timing of the auxiliary light emitting unit and an image capturing timing of the imaging unit.

6. The imaging apparatus according to claim 5, further comprising:
a bright point detector configured to detect a bright point in a third image corresponding to third image data generated by the imaging unit after the light emission controller has output the inhibition signal to the auxiliary light emitting unit; and
an image processing unit configured to perform processing to lower an exposure value and/or color saturation with respect to the third image data at a time the bright point detector has detected a bright point in the third image.

7. The imaging apparatus according to claim 4, further comprising
an imaging controller configured to cause the imaging unit to perform image capturing at a time the input unit has input the image capturing instruction signal, wherein
the light emission controller is configured to output the instruction signal to the auxiliary light emitting unit just after the input unit has received input of the image capturing instruction signal, and
the imaging controller is configured to cause the imaging unit to capture an image to generate the second image data by synchronizing an light emission timing of the auxiliary light emitting unit and an image capturing timing of the imaging unit.

8. The imaging apparatus according to claim 7 further comprising:
a recording medium configured to record image data; and
a temporary storage unit configured to temporarily store the second image data generated by the imaging unit, wherein
the imaging controller is configured to record the second image data stored in the temporary storage unit in the recording medium at a time the determination unit determines that the fog or haze is not occurring.

9. A method for controlling light emission in an imaging system, the method comprising:
generating, with the imaging system, image data of an object by imaging the object;
emitting, with the imaging system, auxiliary light to the object;
calculating, with the imaging system, a contrast evaluation value of each of first image data generated by the imaging system and second image data generated by the imaging system in a state in which the imaging system emits auxiliary light to the object;
determining, with the imaging system, that fog or haze is occurring at a time the calculated contrast evaluation value of the first image data is equal to or greater than the calculated contrast evaluation value of the second image data; and
outputting an inhibition signal for inhibiting auxiliary light emission responsive to a determination that the fog or haze is occurring.

10. A non-transitory computer-readable medium storing a computer program which, when executed by a least one processor performs a method for controlling light emission in an imaging system, the method comprising:
generating, with the imaging system, image data of an object by imaging the object;
emitting, with the imaging system, auxiliary light to the object;
calculating, with the imaging system, a contrast evaluation value of each of first image data generated by the imaging system and second image data generated by the imaging system in a state in which the imaging system emits auxiliary light to the object;
determining, with the imaging system, that fog or haze is occurring at a time the calculated contrast evaluation value of the first image data is equal to or greater than the calculated contrast evaluation value of the second image data; and
outputting an inhibition signal for inhibiting auxiliary light emission responsive to a determination that the fog or haze is occurring.

* * * * *